United States Patent [19]
Mauri et al.

[11] 3,843,680
[45] *Oct. 22, 1974

[54] PROCESS FOR PRODUCING DI-OR POLYNUCLEAR HETEROCYCLIC COMPOUNDS

[75] Inventors: Marcello Massi Mauri, San Donato Milanese; Pietro Moggi, Milan, both of Italy

[73] Assignee: Snam Progetti S.p.A., Milan, Italy

[ * ] Notice: The portion of the term of this patent subsequent to Nov. 20, 1990, has been disclaimed.

[22] Filed: Sept. 30, 1971

[21] Appl. No.: 185,075

[30] Foreign Application Priority Data
Sept. 30, 1970  Italy................................. 30357/70

[52] U.S. Cl......... 260/319.1, 260/283 SY, 260/315, 260/330.5, 260/346.2 R, 260/326.15
[51] Int. Cl............................................ C07d 27/56
[58] Field of Search................................. 260/319.1

[56] References Cited
UNITED STATES PATENTS
2,409,676  10/1946  Gresham et al.................. 260/319.1
3,271,414   9/1966  Frangatos...................... 260/319.1

Primary Examiner—Joseph A. Narcavage
Attorney, Agent, or Firm—Ralph M. Watson, Esq.

[57] ABSTRACT

Di- or polynuclear heterocyclic compounds are prepared through an oxidative dehydrocyclization of a substituted monocyclic aromatic compound.

12 Claims, 1 Drawing Figure

PATENTED OCT 22 1974
3,843,680
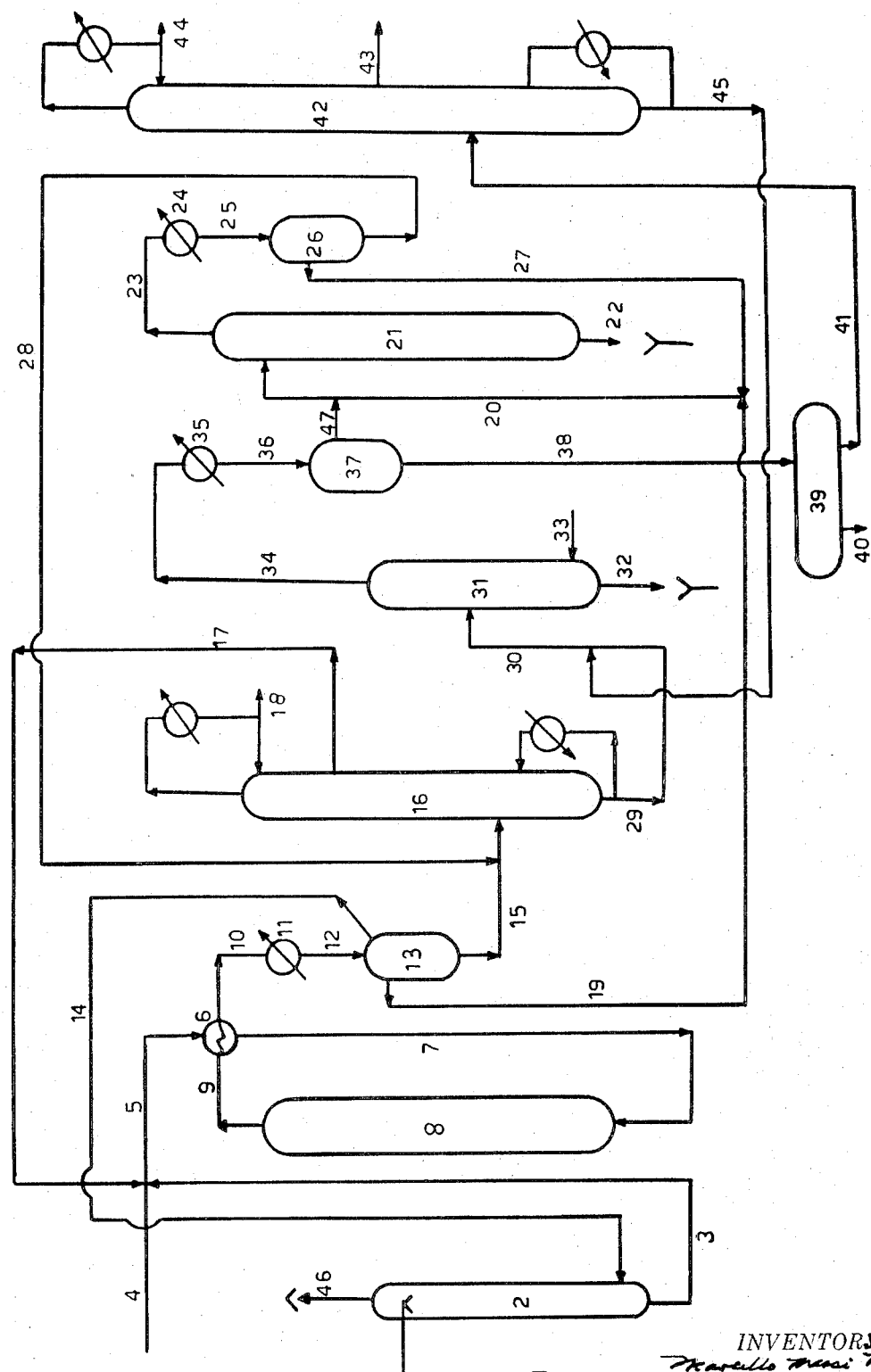

PROCESS FOR PRODUCING DI-OR POLYNUCLEAR HETEROCYCLIC COMPOUNDS

The present invention relates to a process for producing di- or polynuclear heterocyclic compounds. More particularly it relates to a process for producing high purity heterocyclic compounds.

Polynuclear heterocyclic compounds are obtained according to well-known methods through the use of expensive starting materials and/or catalysts and through processes which often give rise to low yields of the final product. Moreover very elaborate extraction and purification methods are known which are very difficult and expensive when carried out. Furthermore neither the recovery of by-products nor the recycle of unreacted products are provided for, which adversely affects the process economy.

We have found, and it is the object of the present invention, that it is possible to obtain very high purity di- or polynuclear heterocyclic compounds at high yields by means of a simple and cheap process.

According to the process of the present invention, a stream of a substituted aromatic compound is fed to a reactor kept at high temperature; the effluent from the reactor, after heat exchange with the feed, enters a separator from which the uncondensable products come out, and the vapors are removed by the new aromatic compound stream acting as washing stream. The mixture of the remaining products is sent to purification treatment permitting the recovery of the heterocyclic derivative of the starting products and possible intermediate products which are recycled to the reaction vessel.

Such a process may be carried out on numerous substituted organic compounds which may be exemplified by the formula:

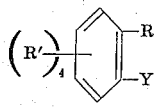

wherein R may be an alkyl radical having at least two carbon atoms, or an aryl radical; R' may be hydrogen, an alkyl or aryl radical, a nitro-, halogen-, cyano-, amino-, alkoxy-, —OH, —SO$_3$H, or —SH group, or a divalent radical giving rise to a condensed ring; Y may be a member of the group consisting of —OH, —SH, —NH$_2$, —NHR'', R'' being an alkyl or an aryl radical.

Unrestrictive examples of the inventive process are the preparations of indole from o-ethylaniline, scatole from o-isopropylaniline, benzofuran from ethylphenol, benzothiofene from o-ethylthiophenol, carbazole from o-aminodiphenyl, quinoline from o-propylaniline and the like.

With the provision that the inventive process is quite general, some other heterocyclic compounds may be obtained at a high purity degree by employing the inventive process, hereinafter we shall simply refer to a process for the production of indole, which process being performed by an oxidative catalytic dehydrocyclization of o-ethylaniline according to U.S. Pat. No. 3,773,784.

According to the aforesaid applications a mixture of o-ethylaniline and oxygen, or oxygen containing gas, is passed through a reactor, at high temperature and, according to a preferred performing, in the presence of steam or any inert diluent, on a catalyst constituted by activated silica, or by a mixture of antimony oxide and of an oxide of a metal selected from the ones belonging to the third, fourth, sixth and eighth groups of the periodic system, or by a bismuth, molybdenum and vanadium base ternary compound. The molar ratio between oxygen and o-ethylaniline ranges from 0.2 : 1 to 5 : 1. By working at values lower than 0.2 : 1 the reaction occurs with low yields, whereas by working at a molar ratio higher than 5 : 1 excessive oxidation products prevail. A particularly preferred range of oxygen to substituted aromatic compound is from 0.8 : 1 to 2.5 : 1.

As diluent of the reaction mixture use may be made of steam, nitrogen, argon, carbon dioxide, saturated hydrocarbons such as n-pentane, iso-pentane, n-hexane, n-heptane, or any other substance which is not modified by the reaction conditions. The use of steam in a molar ratio to the aromatic compound in the range from 5 : 1 to 75 : 1 is particularly advantageous.

The process is carried out at a temperature ranging from 350° to 700° C. The pressure may range from a few mmHg to 10 atmospheres, the preferred process being carried out at atmospheric pressure. The apparent contact time between reactants and catalyst is selected in the range from 0.1 to 10 seconds, the range of 0.2 to 2.5 seconds being particularly preferred. As apparent contact time between reactants and catalyst we mean the ratio between the volume of the catalytic bed and the flow of the reactants as gases at the reaction conditions.

An unrestrictive example of the inventive process will now be described:

With reference to the enclosed drawing, o-ethylaniline is sent through 1 to 2 wherein it is employed as washing stream to remove vapors which come from the separator 13 through 14, together with the uncondensable products and constituting about 10% of the organic feed. Then, through 3, ortho-ethylaniline is mixed with air and steam coming from 4 and, together with the recycle stream coming from 16 through 17, is sent into reactor 8 by means of 5 and 7, after having been preheated by the product sensitive heat in 6.

The effluent from 8 through 9, after having heat exchanged with the feed in 6 and, through 10, undergone a further cooling in 11, enters 13 by 12. The uncondensable products come out from 13, and are fed through 14 to 2 wherein they are set free from the vapors and then sent to the chimney through 46.

The watery phase, separating on the top of 13, is sent, by means of 19 and 20, to the column 21 to recover the organic compounds dissolved therein with respect to their water solubility; steam comes out from 21 through 23, crosses the exchanger 24 and arrives, through 25, into the separator 26, in which the two phases are separated and the organic one gets out by 28 and combines with the organic phase coming out from 13 through 15. The water returns to 21 by means of 27 and 20. The excess of water is discharged into the sewer from the bottom of 21, through 22.

The product mixture is fed by 15 to the under vacuum distillation column 16, in the top of which the light by-products are removed by 18, whereas the o-ethylaniline and o-aminostyrole mixture is drawn by an intermediate plate and is recycled through 17 to the reactor; indole and the heavy by-products are discharged from the bottom of the column, through 29 and 30. The mixture of indole and heavy by-products flow through 30 into 31 wherein it undergoes a steam distillation, steam being fed to the column by means of 33.

Indole, mixed with water, is recovered through 34, cooled in 35 and, through 36, enters 37 wherein it is separated in the melted state. A product is obtained having a purity equal to about 98% which, flowing through 38, is stored up in 39 wherefrom it may be drawn by 40 without being further purified. The water separated in 37 is sent by 47 to the column 21. From the bottom of 31, the excess of water is discharged into the sewer by means of 32.

When washing indole at a purity higher than 98%, a final purification is carried out by drawing the compound from the tank 39 by means of 41 and sending it to the column 42, which is under vacuum.

The pure final product is drawn by an intermediate plate through 43; from the top, by 44, water and the impurities having a lower boiling point are removed, whereas from the bottom is separated a fraction having a higher boiling point which is sent, through 45, to steam distillation in the column 31.

It is clear that other heterocyclic compounds may be obtained by employing the aforesaid process with suitable modifications well known to those skilled in the art and which do not change the nature of the invention.

The following unrestrictive example is supplied to make it clear that the inventive process allows high purity heterocyclic compounds to be obtained:

EXAMPLE

Hereinafter we shall describe a process of recovering and purifying indole produced by dehydrocyclization of o-ethylaniline.

19.2 Kg of silica Ludox A.S., atomized and having a superficial area equal to 298 m$^2$/g (granulometry: 90% between 30 and 120 $\mu$) were charged on a reactor having a 6 inch internal diameter and 11 m height, and heated by means of melted salts.

The reactor was fed with o-ethylaniline, air and water, preheated at 500° C, at the atmospheric pressure and a H$_2$O/o-ethylaniline molar ratio of 10 : 1 and O$_2$/o-ethylaniline of 1.2 : 1.

By working at a temperature of 560° C, the following results were obtained:

| | |
|---|---|
| O-ethylaniline conversion % | 60.5 |
| Indole selectivity % | 69 |
| O-aminostyrole selectivity % | 10 |
| CO + CO$_2$ selectivity % | 11.5 |
| Indole yield % | 42 |

With reference to the schematic drawing, the mixture, flowing from the reactor 8, after having been cooled by the exchanger 6 and 11, arrived into the separator 13. Herein an organic phase (1.20 density) was separated from a watery phase (the former being below the latter), whereas the uncondensable products from the top of the separator carrying a portion of the reaction products as vapors were recovered. The uncondensable products stream (about 3 Nmc/h) carried 0.25 kg/h of vapors having the following composition:

| | | |
|---|---|---|
| -water | 16 % | by weight |
| -o-ethylaniline | 48 % | do. |
| -o-aminostyrole | 4 % | do. |

-Continued

| | | |
|---|---|---|
| -indole | 28 % | by weight |
| -other | 4 % | do. |

The vapors were removed in 2, it being a column containing 2.5 m packing of Raching rings constituted by ceramic material, by washing with the fed o-ethylaniline (3 kg/h). The liquid collected on the bottom of 2, joined to the recycle stream, is fed to reactor 8, the watery phase containing dissolved reaction products with regard to their solubility. It constituted a stream of about 5 Kg/h having the following composition:

| | | |
|---|---|---|
| o-ethylaniline | 2.2 % | by weight |
| o-aminostyrole | 0.6 % | do. |
| indole | 1.5 % | do. |
| other | 0.4 % | do. | the balance consisting of water. This latter was sent to the stripping column 21, formed by a packed column, corresponding to about ten plates and working at atmospheric pressure.

On the top (T = 95° – 100° C) a mixture was distilled which consisted of several azeotropes formed by water with each one of the dissolved organic components, whereas water containing traces of high boiling components was discharged in the sewer from the bottom (105° – 110° C). The distilled mixture was, after having been cooled by the exchanger 24, separated into two phases (26); the watery one was recycled to the stripper whereas the organic one, joined to the organic phase coming from 13, was sent to the under vacuum fractionation column 16; 16 was fed by a stream of 2.7 kg of organic phase having the following composition:

| | | |
|---|---|---|
| water | 1.8 % | by weight |
| light components | 1.0 % | do |
| o-ethylaniline | 42.7 % | do. |
| o-aminostyrole | 5.7 % | do |
| indole | 45.7 % | do. |
| heavy components | 3.1 % | do. |

16 was constituted by a column having 60 plates shaped as little bells and fed at the 30th plate. It worked at a top pressure of 25 mmHg and at an external reflow rate $L/D = 4$. The boiler temperature was 180° – 185° C, whereas the top one was 102° C. The recycle stream (1.3 kg/h) was drawn by the 50th plate; it was constituted of 90% o-ethylaniline and 10% o-aminostyrole.

From the bottom were withdrawn 1.3 kg/h of a mixture containing 92.5% of indole, which was sent to the under vacuum distillation column 31. This latter consisted both of a boiler (T = 110° – 1,150° C), whereto steam was sent (12 – 12.5 kg/h) at the entering temperature of 110° C, and of a removing part, having the top temperature of 99° C.

The distilled one was then cooled in 35 up to 50° C and recovered in a separator 37; the watery phase was fed to the stripping column 21, whereas the oily phase was collected in a storing tank, kept above 50° C. 1.2 kg/h of the oily phase were collected, consisting of indole having a purity of 98.2%. The main impurities were:

| | | |
|---|---|---|
| o-ethylaniline | 0.2% | by weight |
| o-aminostyrole | 0.1% | do. |

The so-obtained indole (melting point 49.5° – 50.5° C) could still be utilized as such for many purposes (pharmaceutical industry, dyes, etc.). In order to obtain a higher purity useful for other purposes (perfumery, biochemistry, etc.) it is necessary to carry out another distillation under vacuum (column 42). The final purification was performed by means of the column 16, by working at a top pressure of 20 mmHg; the boiler temperature was 190 – 195° C, whereas the top one was 105° C. By feeding 1.2 kg/h of raw indole, it was possible to recover 1.1 kg/h of indole having a purity higher than 99.8%, according to the following analysis:

| traces | < 0.05% | by weight |
|---|---|---|
| heavy metals | 10 | ppm |
| o-ethylaniline | 0.05% | by weight |
| o-aminostyrole | 0.005% | do. |
| melting point | 51.5 – 52.0°C | |

What we claim is:

1. In a cyclic process for the oxidative catalytic dehydrocyclization of a substituted aromatic compound of the formula

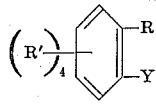

wherein R is lower alkyl containing at least two carbon atoms; R' is hydrogen, alkyl, aryl, alkoxy, nitro, halogen, cyano, amino, hydroxy, —SH, or —SO₃H; Y is OH, SH, NH₂, monoalkylamino or monoarylamino by contacting said substituted aromatic compound with oxygen or an oxygen-containing gas and an activated silica catalyst at a temperature ranging from 350° C. to 700° C. and a pressure of from about 1 mmHg to 10 atmospheres and a molar ratio of oxygen or oxygen-containing gas to substituted aromatic compound ranging from 0.2:1 to 5:1; which comprises the steps of feeding said substituted aromatic compound to a reactor wherein said dehydrocyclization takes place under the abovesaid conditions, subsequently conveying the resultant effluent to a separator and then through purification treatment wherein the desired heterocyclic product is recovered while intermediate products are recycled to the reactor; the improvement which comprises the steps of heat-exchanging said effluent with pre-reacted feed after it leaves the reactor and removing uncondensed products and vapors from said separator which are thereafter washed by the stream of feed compound.

2. A process according to claim 1 characterized in that the substituted aromatic compound is o-ethylaniline.

3. A process according to claim 1 characterized in that the catalyst system is activated silica.

4. A process according to claim 1 characterized in that the reaction is carried out at atmospheric pressure.

5. A process according to claim 1 characterized in that the reaction is carried out in presence of an inert diluent selected from steam, nitrogen, argon, carbon dioxide, or saturated hydrocarbons.

6. A process according to claim 5 characterized in that the diluent is steam at a molar ratio to aromatic compound ranging from 5:1 to 75:1.

7. A process according to claim 2 characterized in that the oxygen or oxygen-containing gas/o-ethylaniline molar ratio ranges from 0.2:1 to 5:1.

8. A process according to claim 7 characterized in that said ratio is 0.8:1 to 2.5:1.

9. A process according to claim 1 characterized in that the contact time between reactants and catalyst ranges from 0.1 to 10 seconds.

10. A process according to claim 9 characterized in that the contact time between reactants and catalyst ranges from 0.2 to 2.5 seconds.

11. A process according to claim 5 wherein said saturated hydrocarbon is selected from n-pentane, isopentane, n-hexane or n-heptane.

12. A process according to claim 6 wherein said aromatic compound is o-ethylaniline.

* * * * *